United States Patent [19]

Nakagawa et al.

[11] Patent Number: 4,952,030
[45] Date of Patent: Aug. 28, 1990

[54] LIQUID CRYSTAL DISPLAY DEVICE WITH A 50°–80° TWIST ANGLE

[75] Inventors: Yutaka Nakagawa, Isehara; Tetsuro Matsumoto, Kawasaki; Yuji Souda; Yosinori Hirai, both of Yokohama, all of Japan

[73] Assignee: Asahi Glass Company, Ltd., Tokyo, Japan

[21] Appl. No.: 237,417

[22] Filed: Aug. 29, 1988

[30] Foreign Application Priority Data

Sep. 4, 1987 [JP] Japan ................. 62-220380
Oct. 1, 1987 [JP] Japan ................. 62-245862

[51] Int. Cl.$^5$ .............................. G02F 1/133
[52] U.S. Cl. .................. 350/337; 350/339 F; 350/347 R; 350/347 E
[58] Field of Search ............ 350/337, 347 E, 347 R, 350/341, 339 F

[56] References Cited

U.S. PATENT DOCUMENTS

| | | | |
|---|---|---|---|
| 4,609,255 | 9/1986 | Leenhouts et al. | 350/341 |
| 4,664,482 | 5/1987 | Kardo et al. | 350/337 |
| 4,815,825 | 3/1989 | Nakagomi et al. | 350/337 |

FOREIGN PATENT DOCUMENTS

| | | | |
|---|---|---|---|
| 2705399 | 8/1977 | Fed. Rep. of Germany | 350/341 |
| 0162225 | 8/1985 | Japan | 350/337 |

*Primary Examiner*—Stanley D. Miller
*Assistant Examiner*—Anita Pellman Gross
*Attorney, Agent, or Firm*—Oblon, Spivak, McClelland, Maier & Neustadt

[57] ABSTRACT

A liquid crystal display device of negative display type, which comprises a liquid crystal cell comprising a nematic liquid crystal layer sandwiched between substrates provided with electrodes, a light shielding layer covering other than the area corresponding to a display pattern, a pair of polarizing films provided on both sides of the liquid crystal cell with their polarization axes arranged to permit light from a no voltage-applied portion to pass therethrough, said liquid crystal cell being adapted to apply a voltage sufficient to energize the nematic liquid crystal to the electrodes at a display pattern area other than a desired display pattern, wherein a twist angle of liquid crystal layer is in a range of 50°–80°.

8 Claims, 3 Drawing Sheets

TWIST ANGLE θ

TWIST ANGLE θ

LIQUID CRYSTAL DISPLAY DEVICE WITH A 50°-80° TWIST ANGLE

BACKGROUND OF THE INVENTION

1. Field of the Invention

The present invention relates to a liquid crystal display device of a negative display type having a light shielding layer formed therein.

2. Discussion of Background

Heretofore, a negative display wherein letters or patterns are displayed brightly on a dark display surface has been used in many cases for liquid crystal display devices used for the display portions of watches or meters for automobiles.

In a negative liquid crystal display device, no voltage is applied to the liquid crystal layer at the background area other than a display area and liquid crystal molecules are twisted at the background area, whereby liquid propagates along the twisted liquid crystal molecules, and a pair of polarizing films are disposed with their polarization axes being in parallel with each other so that no light is transmitted at the background area.

However, the negative liquid crystal display device had a problem in that a degree of polarization is decreased when light propagates in a twisted fashion, light having a certain color is transmitted to some extent, whereby there is caused insufficient contrast at the background area.

In order to resolve the above-mentioned problems, it has been proposed to use a negative type display device in which a light shielding layer is formed at the background area other than a display portion, and a polarizing film is disposed in the same manner as in the case of a positive liquid crystal display device so that light is transmitted at a portion where no voltage is applied to liquid crystal. Specifically, there is proposed a liquid crystal display device of a negative type such that a voltage lower than a threshold voltage or no voltage is applied to a predetermined display pattern area (hereinbelow referred to as a transparent segment) in the display portion so that liquid molecules are twisted to thereby transmit light, and a voltage higher than the threshold voltage is applied to the display portion other than a predetermined display pattern area (hereinbelow, referred to as a light shielding segment) so that liquid crystal molecules are vertically aligned to thereby shield light (Japanese Unexamined Patent Publication No. 162227/1985).

In the above-mentioned display device, since the light shielding segment vertically aligns to the substrate of the liquid crystal molecules, the direction normal to the substrate is coincident with the optical axis direction of the liquid crystal molecules, and they do not show double refraction property when viewed from that direction. Accordingly, there is obtainable substantially the same light shielding property as in the case that polarizing plates are bonded with their polarizing axes being crossed at a right angle, and it is possible to obtain a high ratio in contrast (contrast ratio) as high are at least 1,000.

When the above-mentioned display device is observed from the front, a display with a good contrast is obtainable. However, in this case, the figure of a viewer appears on the display because light reflects on the surface of the substrate, and the content of the display becomes illegible. In order to eliminate such disadvantage, there is proposed a method of inclining the substrate of the liquid crystal cell at an angle ranging from 10° to 40° with respect to the direction of observation which is determined to be at a right angle to the surface of the substrate. However, when the light shielding segment portion of the display device is viewed from an oblique direction, leakage of light is observed, the contrast ratio is decreased and legibility becomes poor. Further, the difference of brightness between the background area and the light shielding segment portion is great, and the difference of brightness between the light shielding segment portion and the transparent segment portion is small, whereby there is caused a problem that it is impossible to incline the substrate of the liquid crystal cell because the content of the display may be misread.

SUMMARY OF THE INVENTION

It is an object of the present invention to provide a liquid crystal display device which provides a high contrast ratio when viewed from an oblique direction.

The present invention is to provide a liquid crystal displaying device of a negative display type comprising a liquid crystal cell comprising a nematic liquid crystal layer sandwiched between substrates provided with electrodes, a light shielding layer covering other than the area corresponding to a display pattern, a pair of polarizing films provided on both sides of the liquid crystal cell with their polarization axes arranged to permit light from a no voltage-applied portion to pass therethrough, the liquid crystal cell being adapted to apply a voltage sufficient to energize the nematic liquid crystal to the electrodes at a display pattern area other than a desired display pattern, wherein said liquid crystal display device has a twist angle of liquid crystal layer which ranges from 50°-80°, or wherein said liquid crystal display device has a twist angle of liquid crystal layer which ranges from 50° to 85° and a pair of polarizing films arranged in such a manner that their polarization axes intersect at a crossed axes angle ranging from 91° to 100°, or wherein said liquid crystal display device has a light shielding layer attached to an inner surface of the liquid crystal cell, an illuminating means provided behind the rear side polarizing film, a twist angle of liquid crystal layer in a range of from 50° to 80°, and a pair of polarizing films being so arranged that their polarization axes intersect at a crossed axes angle ranging from 90° to 100°, or wherein said liquid crystal display device has a twist angle of liquid crystal layer in a range of from 50° to 80°, a pair of polarizing films being so arranged that their polarization axes intersect at a crossed axes angles ranging from 90° to 100°, and the displaying plane of the device inclined at an angle in a range of 10°-40° with respect to the displaying plane, which is aligned with the direction from a viewer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The present invention will be described in detail with reference to the drawings.

Figure 1:
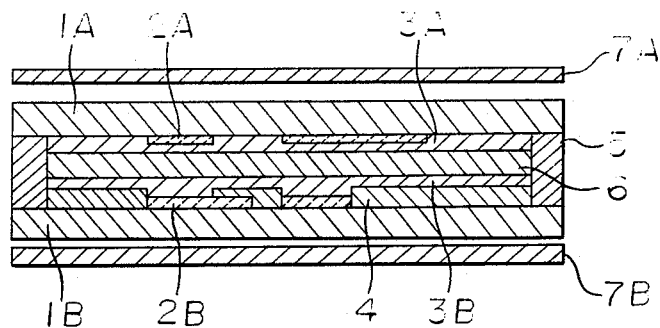
FIG. 1 is a longitudinal cross-sectional view of an embodiment of a liquid crystal cell according to the present invention.

FIG. 1 is a cross-sectional view illustrating a typical embodiment of a twisted nematic liquid crystal display device of negative display type of the present invention.

In FIG. 1, a reference numeral 1A designates a substrate, a numeral 2A designates an electrode formed thereon, and an orientation layer 3A is further formed thereon. Whereas on the other substrate 1B, an electrode 2B and a light shielding layer 4 are disposed to cover an area other than the display pattern area, and an orientation layer 3B is formed thereon. Such a pair of substrates are disposed so that the electrode surfaces face each other and shield along their periphery with a sealing material 5, and a nematic liquid crystal is injected into the interior to form a liquid crystal layer 6, whereby a crystal cell is formed.

It is desirable that the product $\Delta n \cdot d$ of the thickness (d) of the liquid crystal layer and the anisotropy of refractive index ($\Delta n$) of liquid crystal is in a range of 0.3 $\mu m$–1.0 $\mu m$ in order to reduce angular dependency in contrast and to increase a light transmittance in a transparent segment portion.

On both sides of this liquid crystal cell, a pair of polarizing films 7A and 7B are provided so that their polarization axes are arranged to shut off light at a portion where a voltage is applied, as in the case of usual liquid crystal display element of positive display type. For the above-mentioned arrangement, the pair of polarizing films are disposed so that their polarization axes are crossed perpendicularly with each other. However, in the present invention, it is preferable that the polarization axes are not completely perpendicular, but are slightly deflected, specifically, are disposed to form a crossed axes angle ranging from 91° to 100°, in order to further increase a contrast ratio when viewed from an oblique direction. It is especially preferable that the polarization axes of the pair of polarizing films form a crossed axes angle ranging from 91° to 100° when viewed from the main viewing direction which is determined by the direction of orientation of liquid crystal molecules, in the case that the liquid crystal molecules are twisted at both sides of the main viewing direction. Namely, it is preferable to provide a crossed axes angle ranging from 91° to 100° when viewed from the direction of orientation of the liquid crystal molecules at the central portion of the liquid crystal layer.

The direction of orientation of the polarizing films are so determined that the polarization axes of the polarizing films intersect at a predetermined angle on the upper and lower substrates so that liquid crystal molecules form a twisted structure at an angle of 50°–85°, preferably 50°–80°. The angle of intersection is selected to obtain a high contrast ratio in the main viewing direction depending on an angle of installation of the liquid crystal display device. A range of angle which shows the greatest contrast ratio or a higher contrast ratio varies depending on a twist angle, a driving voltage and an angle of bonding the polarizing films. Accordingly, the range of angle should be selected in accordance with the performance to be expected. Generally, the twist angle should be small and the driving voltage should also be small in the case that the display device is observed at a low angle. Particularly, by determining the twist angle to be 60°–75°, there is obtainable an improved contrast ratio when observed in the direction inclined for about 10°–40° with respect to the normal direction of the substrate.

Figure 2:
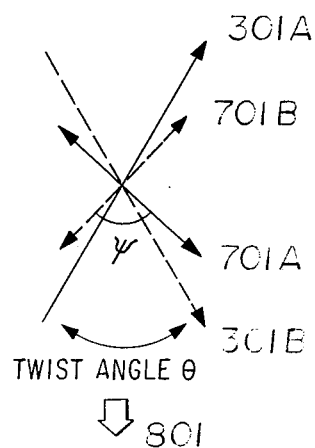
FIG. 2 (a, b) is a diagram showing the relation between the orientation direction of liquid crystal molecules of the liquid crystal cell and the polarization axes of polarizing films in the present invention.
Figure 2:
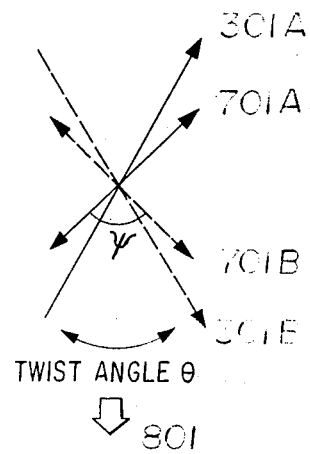

The angle of bonding the polarizing films will be described with reference to FIG. 2. Numerals 301A and 301B respectively designate controlled directions of orientation of the substrates 1A and 1B in view of the side of the substrate 1A. As a method of controlling the orientation, a method of rubbing an organic polymer such as polyimide, polyamide or polyvinyl alcohol is usually used. The numerals 301A, 301B designate the direction of rubbing. The orientation controlling method may be performed by an oblique vapor deposition of a material such as SiO. In this case, the directions of installation of vapor deposition sources are made in coincidence with the directions 301A, 301B. FIG. 2 shows an example in which a twist angle $\theta$ is formed in a liquid crystal display device having a counterclockwise spiral structure. However, when a clockwise spiral structure is used for the display device, replacement of A and B should be made. In FIG. 2, the direction indicated by a numeral 801 is referred to as the main viewing direction which decreases a threshold voltage for the liquid crystal display device. Since a high contrast ratio is obtainable at this direction, it is desirable to dispose the display device so that it is observed from the direction 801.

Numerals 701A and 701B respectively designate the directions of polarization axes of the polarizing films 7A and 7B, which are crossed at a right angle or are slightly deflected. When the liquid crystal display device is observed from the front, the polarizing films are arranged so that the angle of intersection of the polarization axes is a right angle, particularly, it is a correct right angle with error less than 0.5° in order to obtain a high contrast ratio. Thus, there is obtainable a high contrast ratio to some extent by realizing a state of the polarization axes which cross at a correct right angle. However, when the display device is observed from an oblique direction, it is preferable to provide an angle of intersection in a range from 91° to 100° by slightly deflecting the angle of intersection from the correct right angle of intersection. In this case, there is obtainable a higher contrast ratio. The angle of intersection is determined to be 91°–100° with respect to the direction of a viewer. The angle in the direction of the main viewing direction is $\psi = 91°–100°$.

FIG. 2a shows an arrangement in which the polarization axes directions and the orientation controlling direction are crossed at angles near a right angle. The arrangement permits a high contrast ratio at an angle near the front. FIG. 2b shows an arrangement that the polarization axes directions and the orientation controlling directions intersect at angles in nearly parallel. This arrangement permits a relatively high contrast ratio at a low angle and in a broad range. In the present invention, the arrangement as shown in FIG. 2b is prefeably used. It is particularly preferably from the viewpoint of display contrast that an angle of intersection formed by the polarization axes directions and the orientation direction of liquid crystal molecules on the substrates adjacent to the polarization films is in a range of 0°–30°. Especially, it is preferable that an angle of intersection formed by the polarization axes direction and the orientation direction of liquid crystal molecules on one substrate is substantially the same as the angle of intersection on the other substrate. For instance, when $\theta=80°$ and $\psi=94°$, the angle of intersection should respectively be 7°.

The light shielding layer 4 of the present invention may be formed on the inner surface of the liquid crystal cell or on the outer surface thereof, and its light transmittance is adjusted to be in a range from 0.02 to 1.0%. It is preferred to form the light shielding layer on the inner surface of the liquid crystal cell, since positional displacement between the display pattern and the light shielding layer, that is the parallax problem, is then less likely when observed from an oblique direction.

The light shielding layer 4 is formed at the background area of the display and may usually be formed on one of the substrate. It may be divided and formed on both substrates. However, it is advantageous to form it on only one of the substrates, since the progress steps may thereby be reduced in number and the productivity may thereby be increased.

Such a light shielding layer 4 may be formed, for example, by printing a light shielding ink such as a carbon paste or by vapor depositing or plating a metal light shielding layer such as aluminum, nickel or chromium on the transparent electrode and insulating layer.

The sealing material 5 may be a usual sealing material such as an epoxy resin or a silicone resin. It is usual to provide a filling hole in the sealing material. After assembling a cell, the liquid crystal will be injected from the filling hole, and then the hole is sealed.

A small amount of a chiral substance is normally incorporated in the liquid crystal to be injected in order to prevent the liquid crystal from assuming a spiral structure of opposite turn. However, in the present invention, liquid crystal without the chiral substance may be used because the twist angle is smaller than 90°.

Further, a color filter layer may be formed on the inner surface or on the outer surface of the substrate. The substrate may be made of a polarizing film substrate. A touch switch, an ultraviolet cutting filter or a non-glare filter may be laminated on the outer surface of the substrate. A usual technique commonly employed for the liquid crystal display device may be applied so long as it does not adversely affect the effect of the present invention.

In the present invention, the device as a whole is of a negative display type, but the application of a voltage to the electrodes is conducted in the same manner as in the case of a positive display type.

Namely, no voltage or a voltage lower than a threshold value which causes liquid crystal molecules to be vertically aligned is applied to the transparent segment to pass light therethrough in the display portion, and a voltage higher than the threshold value is applied to the light shielding segment. Application of the voltages may be conducted by separately driving the segments or by using a multiplex driving system in which a plurality of segments are driven by a common signal.

As to a voltage used for driving the segments, it is so selected that a high contrast can be provided at an angle which is supposed to be mainly used for observation. In general, a high contrast is obtainable at a large angle (with respect to the normal direction to the substrate) when a higher voltage is used to activate the liquid crystal molecules. When they are actuated by a low voltage, a high contrast is obtainable at a low angle. However, when a voltage to be applied is too low, a sufficient contrast can not be obtained. Generally, it is desirable to actuate the liquid crystal molecules with a voltage in a range of from 1.5 times to 6 times as high as a threshold voltage applied to the normal direction to the substrate.

An illuminating means is usually provided behind the rear side polarizing film. As such illuminating means, a light source such as a tungsten lamp, a cold cathode tube, a hot cathode tube and other known devices are used in association with a device such as a light conductor, a color-temperature-changing filter, an uneven-illumination removing filter and so on, if necessary. Alternatively, a reflecting plate may be provided behind the rear side polarizing film in place of the illuminating means, whereby a display is reflected by utilizing light from the front. Also, the present invention is applicable as an apparatus utilizing light from the back side and the front side by disposing an illuminating means and a semi-transparent, semi-reflecting plate.

A further high contrast is obtainable with a wide range of viewing angles by incorporating a negative type or a positive type dichloric dye in the liquid crystal.

Further, it is possible to reduce angle dependency in contrast by disposing a suitable element having an optical anisotropy between a pair of polarizing films.

In the liquid crystal display device of the present invention, it is preferably that the display plane is inclined at an angle ranging 10°–40° from the normal direction of the display plane with respect to a viewer, whereby a high contrast ratio is obtainable when the liquid crystal display device is viewed from an oblique direction.

In the present invention, the polarization axes of the pair of polarizing films are crossed at substantially a right angle; an optical uniaxial property is realized when the liquid crystal molecules are orientated in substantially the normal direction to the substrate at the time of application of a voltage, and a light shielding degree as obtainable when the polarization axes are crossed at a right angle can be achieved. The twist angle (i.e. 90°) of a conventional liquid crystal layer provides the above-mentioned condition in the direction normal to the substrate. A twist angle of 85° or lower provides a false uniaxial property in the direction of the liquid crystal layer inclined from the direction normal to the substrate, whereby a sufficient light shielding degree is obtainable. However, a twist angle of 50° or less causes a remarkable reduction in contrast and is not practical.

With respect to an angle of intersection of the polarization axes, when the liquid crystal display device is intended to be observed from the direction normal to the display plane, a sufficient contrast ratio can not be obtained if the angle is not determined to be a correct right angle. When the display device is intended to be observed from an oblique direction, a high contrast ratio is obtainable to some extend by rendering the angle of intersection of the polarization axes to be in an orthogonal state even in the case in which the twist angle of the liquid crystal layer is small. However, a further high contrast ratio can be obtained by determining the angle of intersection of the polarization axes to be in a range of 91°-100° with respect to the orientation direction of the liquid crystal molecules at the central portion of the liquid crystal layer in consideration of the optical characteristics of the polarizing film when it receives light from an oblique direction.

Generally, a function of polarization is given to the polarizing film by stretching a polymer film such as polyvinyl alcohol in one direction and orientating a dichloic dye such as iodine in one direction. Accordingly, the polarizing film possesses anisotropy of double refractive indices in the polymer film with respect to the stretching direction and the orthogonal direction to the stretching direction. The anisotropy of double refractive indices does not give any affect to an incident light to a plane including the polarization axis, however, it seems to change the direction of the polarization axes to an incident light to a plane without including the polarization axes. This effect becomes the maximum when light enters into a plane inclined to the polarization axes with an angle of 45°. Namely, even when the polarization axes of a pair of polarizing films are disposed to be crossed perpendicularly, the angle is in fact arranged to be displaced from the right angle for an incident light from an oblique direction, whereby a contrasty ratio is reduced. Accordingly, it is desirable to previously arrange the angle of intersection of polarization axes by slightly deflecting it from an angle of 90° when the liquid crystal cell is used in an inclined state.

When the angle of intersection is deflected from the right angle (90°), the deflection has to be done so as to correct the false right angle. In FIG. 2, the orientation direction of the liquid crystal molecules at the central portion of the liquid crystal layer is the center of the twist angle, namely, the molecules are oriented in the direction indicated by 801 which corresponds to the main viewing direction. Therefore, it is desirable to dispose the polarization axes to form an angle of intersection greater than 90° in view from the orientation direction of liquid crystal molecules when the display plane is viewed from the main viewing direction. In this case, a clear effect can not be obtained unless the angle of intersection is changed at least 1°. On the other hand, when the angle of intersection is changed to 100° or more, a viewing angle having a high contrast becomes narrow and it is not practical. It is preferable to increase the angle of intersection as an angle formed by the liquid crystal cell and a viewer is deflected from 90°. Especially, it is preferable that the range of the angle is 92°-97°.

Now, the present invention will be described in further detail with reference to Examples. However, it should be understood that the present invention is by no means restricted to such specific Examples.

COMPARATIVE EXAMPLE

A liquid crystal cell was assembled to have a structure as shown in FIG. 1, wherein a twist angle of the liquid crystal layer is determined to be 90°, ZLI-2978-000 ($\Delta n=0.087$) manufactured by Merck Co. was used as a liquid crystal, G-1220Du manufactured by Nitto Denkou K.K. was used as polarizing films so that the orientation direction of the liquid crystal molecules are substantially in parallel to the direction of the polarization axes on adjoining substrates. The cell gap was 5.9 $\mu$m, and $\Delta nd=0.51$ $\mu$m. The light shielding layer was formed by printing a carbon ink and the light transmittance was 0.2%.

Figure 3:
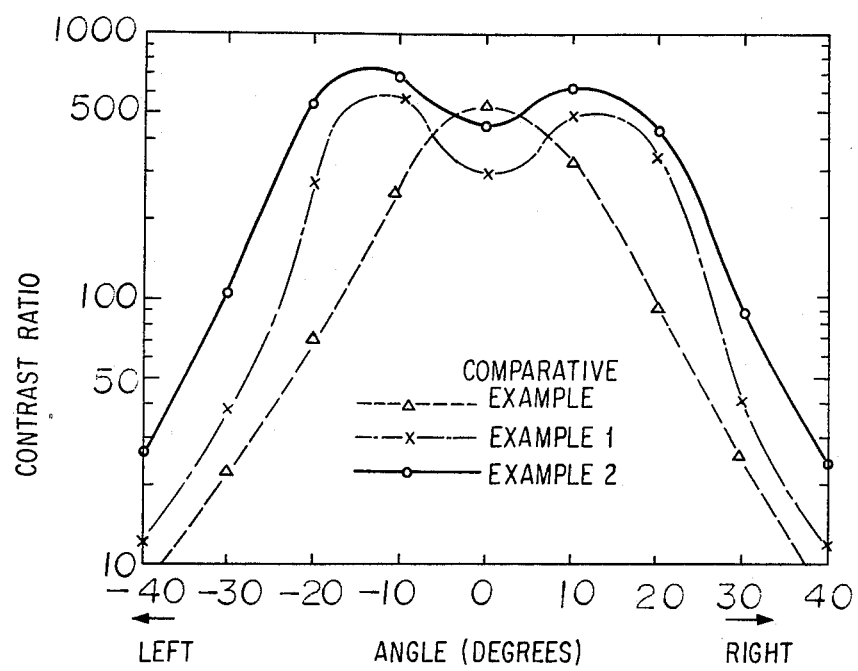
FIGS. 3 and 4 are respectively graphs showing characteristics in embodiments of the present invention and a Comparative Example.

The liquid crystal cell is inclined at an angle of 20°, and evaluation of legibility of the cell was conducted by turning the cell around the central axis of the liquid crystal cell inclined at the angle of 20°. In FIG. 3, the ordinate represents the contrast ratio of transmitting light quantities when a driving signal of a 10 V and 100 Hz rectangular wave is applied and when no electric field is applied, and the contrast ratio obtained when the turning angle is changed is indicated by a dotted line in FIG. 3. In the front direction, there is obtainable a contrast ratio of about 500 which is excellent. However, when viewed from the directions inclined toward left or right, residual transmission of light (bleed through) from the light shielding segment rapidly increases, whereby the display becomes illegible. When the inclination angle is 20° or more, the contrast ratio becomes 100 or less, and misreading likely occurs.

EXAMPLE 1

A liquid crystal cell was prepared in the same manner as Comparative Example except that the twist angle was 70°, the cell gap was 5.8 $\mu$m, $\Delta nd=0.50$ $\mu$m and a pair of polarizing films were disposed so that an angle formed by the direction of a polarization axis and the orientation direction of the liquid crystal molecules on the adjoining substrate was 80° and two polarization axes were crossed at a right angle as shown in FIG. 2a. The liquid crystal cell was inclined at an angle of 20°, and evaluation of legibility was conducted by turning the cell around its central axis inclined at the angle of 20°. Change of the contrast ratio obtained when the cell is turned around the central axis and when the cell is activated with a voltage of 7.3 V is indicated by one-dotted chain line as shown in FIG. 3. Although the contrast ratio was decreased to 300 in the front direction, an increase of 5° of an angle range having good legibility was obtained at both sides in comparison with the Comparative Example.

EXAMPLE 2

A liquid crystal cell was assembled in the same manner as Example 1 except that the twist angle of the liquid crystal was 70° and the polarizing films were arranged so that an angle formed by the direction of a polarization axes and the orientation direction of the liquid crystal molecules on the adjacent substrate was 10° and the polarization axes of the polarizing films were crossed at a right angle. A solid line in FIG. 3 shows a result of the evaluation conducted in the same manner as Example 1. It is found that the contrast ratio at the front increases to about 450 and legibility at both sides becomes well. The contrast ratio is about 100 even at position inclined at 30° on the left or right side, which remarkably improved legibility in comparison with Comparative Example.

Since the liquid crystal cell is inclined at 20°, reflection of the figure of a viewer on the surface of the cell is avoidable and a good display is obtainable.

EXAMPLE 3

A liquid crystal cell was prepared in the same manner as in Example 2 except that the twist angle of the liquid crystal was changed from 50° to 80°, and an angle at which legibility of the cell becomes the best was examined. A result of the examination is shown in Table 1.

In Table 1, the cell should be set uprightly as the twist angle approaches 90°, however, there arises a problem of reflection of the figure of a viewer. It is possible to incline the cell as the twist angle becomes small. However, the contrast ratio is decreased as the twist angle becomes small, and a sufficient contrast ratio can not be obtained when the twist angle is 50° or less.

TABLE 1

| Twist angle | Angle to obtain the best legibility |
| --- | --- |
| 50° | 27° |
| 55° | 27° |
| 60° | 27° |
| 65° | 26° |
| 70° | 25° |
| 75° | 23° |
| 80° | 18° |

EXAMPLE 4

A liquid crystal cell was prepared to have a structure as shown in FIG. 1, wherein the twist angle of the liquid crystal layer was 70°, ZLI-2978-000 ($\Delta n=0.087$) manufactured by Merck Co. was used as the liquid crystal, G-1220Du manufactured by Nitto Denko K.K. was used as the polarizing films so that the films were so arranged that an angle formed by the direction of the polarization axes and the orientation direction of the liquid crystal molecules on each ajoining substrate was 10°, and an angle of intersection formed by to polarization axes was a right angle. The cell gap was 6.0 μm and therefore $\Delta nd=0.52$ μm. The light shielding layer was formed by printing carbon ink and the light transmittance was 0.2%.

Figure 4:
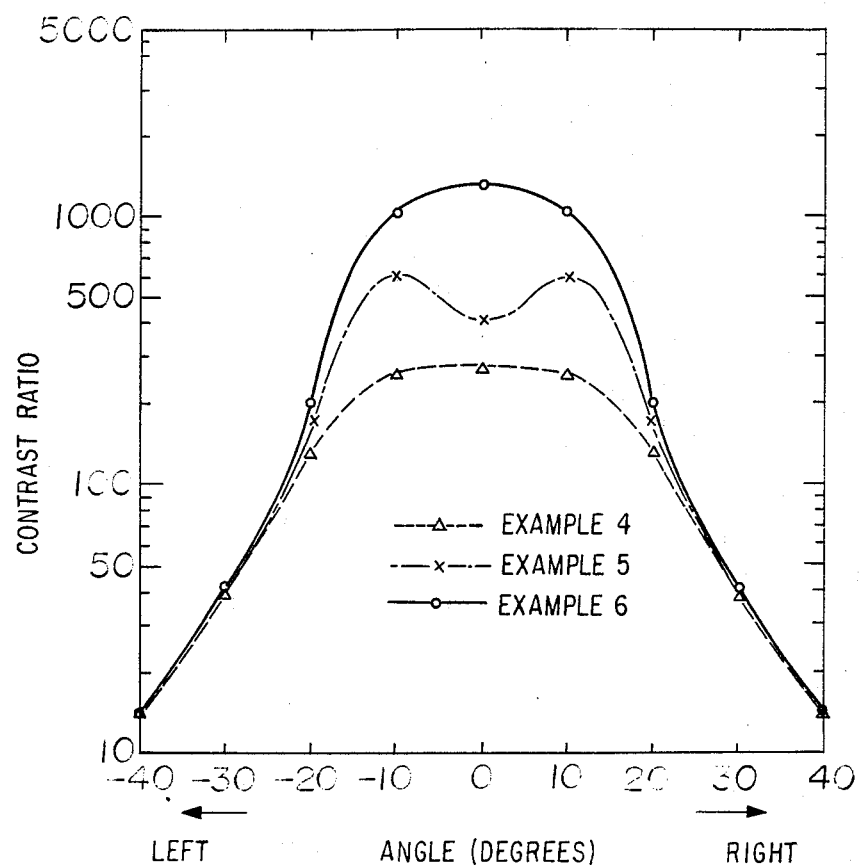

The cell was inclined at an angle of 30° and evaluation of legibility was conducted by turning the cell (in the direction perpendicular to the extension of the arrow mark 801 in FIG. 2) around its central axis inclined at the angle of 30°. FIG. 4 shows a result of the evaluation. The ordinate represents a contrast ratio of light transmitting quantities at the segment part when a driving signal of 6.9 V and 100 Hz rectangular wave is applied and when no electric field is applied. Change of the contrast ratio obtained when the angle of the cell is changed is indicated by a dotted line in FIG. 4. This example provided a contrast ratio more than 100 in a relatively broad angle range, however, it provided a contrast ratio of about 270 at the front side.

EXAMPLE 5

A liquid crystal cell was prepared in the same manner as Example 4 except that the twist angle was 70°. The cell gap was 6.0 μm and $\Delta nd=0.52$ μm. Two polarizing films were arranged so that an angle formed by the direction of a polarization axis and the orientation direction of the liquid crystal molecules on the ajoining substrate was 81.8° and the angle of intersection formed by the two polarization axes was 93.6° in the direction indicated by the arrow mark 801 in FIG. 2(a). The cell was inclined at an angle of 30°, and evaluation of legibility was conducted by turning the cell around the central axis in the same manner as in the Comparative Example. Change of the contrast ratio obtained when the cell is activated with a voltage of 6.9 V and it is turned around the central axis is shown by one-dotted chain line in FIG. 4. The contrast ratio of the cell at the segment portion in the front direction increased in a broad range, and an angle range having a good legibility was obtained at both sides in comparison with the Comparative Example.

EXAMPLE 6

A liquid crystal cell was prepared in the same manner as in Example 5 wherein the twist angle of the liquid crystal was 70° and the polarizing films were arranged so that an angle formed by the direction of a polarization axis and the orientation direction of the liquid crystal molecules on the ajoining substrate was 11.8° and the angle of intersection formed by the two polarization axes was 93.6° as shown in FIG. 2(b). A solid line in FIG. 4 shows a result obtained by evaluation in the same manner as Example 1. The contrast ratio in the front direction increased to about 1,300 and legibility is improved at both sides. This embodiment remarkably improved legibility in comparison with Examples 1 to 4.

Arrangement of the cell at an angle of 30° eliminates reflection of the figure of a viewer on the surface of the cell and a good display is obtainable.

EXAMPLE 7

A liquid crystal cell was prepared in the same manner as Example 6 wherein an angle of intersection of the polarization axes was changed. The cell was inclined at an angle of 30° and the maximum contrast ratio was measured. Table 2 shows a result of measurement.

The cell was inclined at an angle of 40° and the maximum contrast ratio was measured. Table 3 shows a result of measurement.

TABLE 2

| Angle of intersection | Maximum contrast ratio |
| --- | --- |
| 90° | 270 |
| 91° | 500 |
| 92° | 980 |
| 93° | 2,000 |
| 94° | 1,300 |

TABLE 3

| Angle of intersection | Maximum contrast ratio |
| --- | --- |
| 90° | 100 |
| 93° | 500 |
| 93.6° | 740 |
| 94.6° | 1,300 |
| 97° | 300 |

The tables show that the contrast ratio can be remarkably improved by increasing an angle of intersection by the polarization axes, and it was desirable to increase the angle of intersection by the polarization axes as an angle of inclination of the cell was large.

EXAMPLE 8

A liquid crystal cell was prepared in the same manner as in Example 5 wherein the twist angle of the liquid crystal is changed from 50° to 85°. For each cell, an angle which provides the best legibility was examined. Table 4 shows a result of examination.

Table 4 shows that it is necessary to set the cell uprightly as the twist angle approaches 90°. In this case, there arises a problem of reflection of the figure of a viewer. The cell can be inclined as the twist angle becomes small. However, the contrast ratio decreases as the twist angle becomes small, and a sufficient contrast ratio can not be obtained at a twist angle of 50° or less.

TABLE 4

| Twist angle | Angle to obtain the best legibility |
| --- | --- |
| 50° | 40° |
| 55° | 40° |
| 60° | 40° |
| 65° | 34° |
| 70° | 30° |
| 75° | 25° |
| 80° | 20° |
| 85° | 15° |

In the present invention, it is possible to incline a viewing direction of a high contrast ratio from the direction normal to the cell substrate. Particularly, the liquid crystal cell allows a viewer to observe a normal reflecting light of outer light on the cell surface by incorporating a shielding device which prohibits the outer light from entering in an oblique direction to the circumference of the cell, whereby a display can be easily observed. Further, it is obtainable a display having a relatively high contrast ratio in a broad angular range.

In the conventional display system, a sufficient viewing angle could not be obtained only when a high voltage of 3 times to 5 times as high as a voltage which causes an optical change to the liquid crystal cell was applied. On the other hand, it is sufficient to apply a voltage of about 2 times to 3 times, by which a low voltage driving is possible.

Obviously, numerous modifications and variations of the present invention are possible in light of the above teachings. It is therefore to be understood that within the scope of the appended claims, the invention may be practiced otherwise than as specifically described herein.

What is claimed is:

1. A liquid crystal display device of negative display type, which comprises a liquid crystal cell comprising a nematic liquid crystal layer sandwiched between substrates provided with electrodes, a light shielding layer covering other than the area corresponding to a display pattern, a pair of polarizing films provided on both sides of the liquid crystal cell with their polarization axes arranged to permit light from a no voltage-applied portion to pass therethrough, said liquid crystal cell being adapted to apply a voltage sufficient to energize the nematic liquid crystal to the electrodes at a display pattern area other than a desired display pattern, wherein a twist angle of the liquid crystal layer is in a range of 50°–85°, and the polarizing films are so arranged that their polarization axes intersect at a crossed axes angle ranging from 91° to 100°.

2. The liquid crystal display device according to claim 1, wherein the pair of polarizing films are so arranged that their polarization axes intersect at a crossed axes angle ranging from 92° to 97°.

3. The liquid crystal display device according to claim 1, wherein the twist angle of the liquid crystal layer is in a range of 60° to 75°.

4. The liquid crystal display device according to claim 1, wherein the product $\Delta nd$ of the thickness (d) of the liquid crystal layer and the anisotropy of refractive index ($\Delta n$) of the liquid crystal is in a range of 0.3 $\mu$m - 1.0 $\mu$m.

5. The liquid crystal display device according to claim 1, wherein a crossed axes angle formed by the polarization axes of the polarizing films and the orientation direction of the liquid crystal molecules on the substrates which adjoin the polarizing films is in a range of 0°–30°.

6. The liquid crystal display device according to claim 5, wherein the crossed axes angles formed by the polarization axes and the orientation direction of the liquid crystal on the substrates which adjoin the polarizing films are substantially the same at both the substrate.

7. A liquid crystal display device of negative display type, which comprises a liquid crystal cell comprising a nematic liquid crystal layer sandwiched between substrates provided with electrodes, a light shielding layer covering other than the area corresponding to a display pattern, a pair of polarizing films provided on both sides of the liquid crystal cell with their polarization axes arranged to permit light from a no voltage-applied portion to pass therethrough, said liquid crystal cell being adapted to apply a voltage sufficient to energize the nematic liquid crystal to the electrodes at a display pattern area other than a desired display pattern, wherein the light-shielding layer is attached to an inner surface of the liquid crystal cell; an illuminating means is provided behind the rear side polarizing film; a twist angle of the liquid crystal layer is in a range of 50°–80°, and the pair of polarizing films are so arranged that their polarization axes intersect at a crossed axes angle ranging from 90° to 100°.

8. The liquid crystal display device according to claim 7, wherein the twist angle of the liquid crystal layer is in a range of 60° to 75°.

* * * * *